Figure 1:
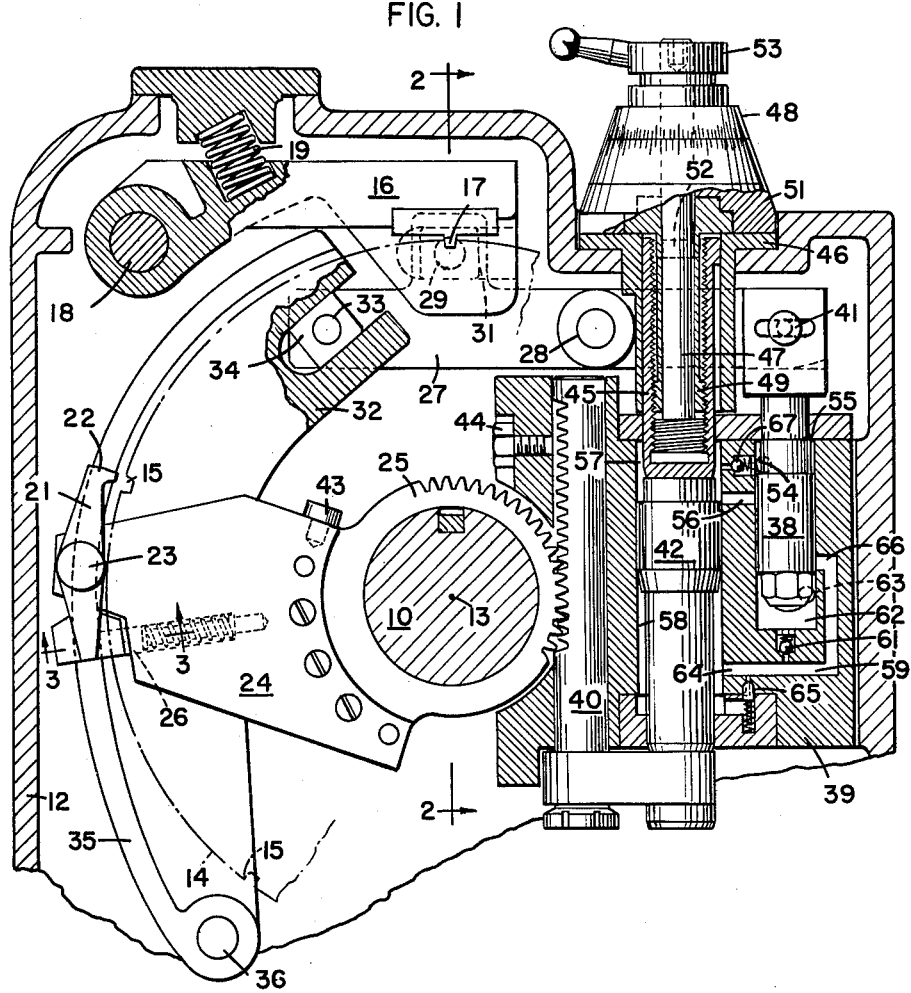

April 24, 1962  E. A. HEDIGER  3,030,826
INDEX MECHANISM

Filed Oct. 18, 1960  2 Sheets-Sheet 1

INVENTOR.
EDWIN A. HEDIGER
BY
Richard W. Treverton
ATTORNEY

April 24, 1962　　　E. A. HEDIGER　　　3,030,826
INDEX MECHANISM
Filed Oct. 18, 1960　　　　　　　　　　　2 Sheets-Sheet 2
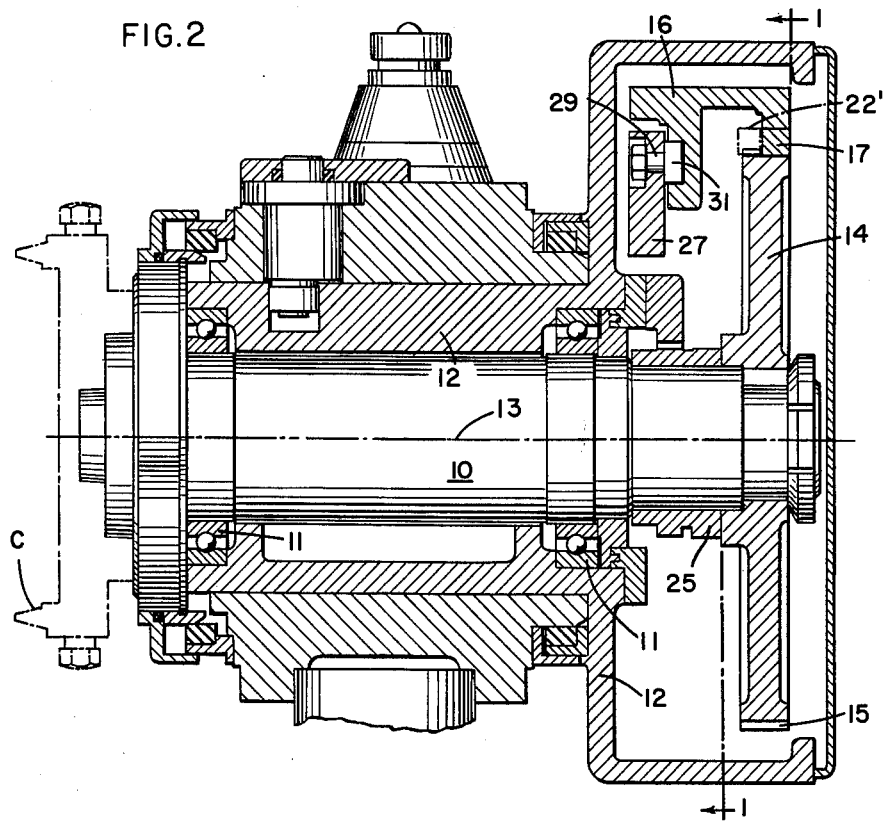
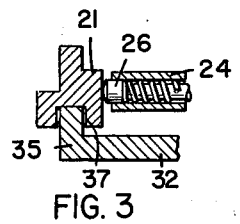

3,030,826
INDEX MECHANISM
Edwin A. Hediger, Rochester, N.Y., assignor to The Gleason Works, Rochester, N.Y., a corporation of New York
Filed Oct. 18, 1960, Ser. No. 63,412
10 Claims. (Cl. 74—822)

The present invention relates to an improved index mechanism for machine tools, for example for the cutter spindle of the cutter sharpening machine disclosed in the co-pending application of Leonard O. Carlsen and Thomas A. Deprez filed on even date herewith.

An object of the invention is an index mechanism, of the type employing a notched index plate, which is simple, rugged and accurate, wherein the index plate is always under the positive control of either a locking pawl or an indexing pawl, wherein the indexing action may be accomplished hydraulically through any of various angles which may be determined by a single adjustment, and wherein the locking and indexing pawls may be controlled by a hydraulic piston which also controls the hydraulically-effected indexing action.

The foregoing and other objects and advantages will appear from the following description of the preferred embodiment of the invention shown in the acompanying drawings, wherein:

FIG. 1 is a sectional view through the index head of a machine, approximately in planes 1—1 of FIG. 2, perpendicular to the axis of indexing motion;

FIG. 2 a sectional view in plane 2—2 of FIG. 1, which contains said axis; and,

FIG. 3 is a detail sectional view in plane 3—3 of FIG. 1.

The indexing mechanism illustrated is for effecting blade-to-blade advance of a cutter C to be sharpened and for that purpose mounted on spindle 10 of a cutter sharpening machine. The spindle is journaled in antifriction bearings 11 in a housing 12, for rotation about axis 13. An index plate 14 is detachably secured to the spindle and has around its periphery a number of notches 15. The plate is interchangeable with others of the same diameter but having different numbers of notches. A locking pawl 16 having a tooth 17 engageable in any one of the notches is pivoted at 18 to the spindle housing 12 and is urged into such engagement by a spring 19. For causing indexing advance of the plate and spindle, an indexing pawl 21 having a tooth 22, which is also engageable in any one of notches 15, is pivoted at 23 to a pawl carrier arm 24. This arm is carried by a segmental pinion 25 rotatably supported by the spindle. A spring-backed plunger 26 carried by arm 24 constantly urges motion of pawl 21 in a direction to engage tooth 22 with the plate.

For effecting alternate engagement of the pawls 16 and 21 with the plate, there is a lever 27 fulcrumed to the housing by a pin 28. The lever is pivoted to pawl 16 by means of a pin 29 which pivotally supports a block 31 that is slidable in a slot in the pawl. The lever is also pivotally connected to a pawl lifter 32 by means of pivot pin 33 and a block 34 slidable in a slot in the lifter. The latter has a flange 35 extending around a substantial part of the periphery of the plate 14 and is pivoted at 36 to the housing 12. The end of pawl 21 opposite to tooth 22 has a slot 37 receiving flange 35. The arrangement is such that upon clockwise motion (in FIG. 1) of the lever 27 about fulcrum 28 the tooth 17 of pawl 16 is lifted clear of the index plate and simultaneously the lifter is swung counterclockwise about its pivot 36 to allow motion of pawl 21 clockwise about its pivot 23 to arm 24 and cause tooth 22 to enter a notch 15 of the plate. The spring-backed plunger 26 effects the entry. Upon return or counterclockwise motion of the lever 27 back to the position shown, locking pawl 16 is re-engaged with the index plate and pawl 21 is lifted from such engagement. The index plate is always under the control of one of the two pawls, tooth 22 entering one notch 15 before tooth 17 has fully withdrawn from another, and vice versa.

The pawl-control lever 27 is actuated by a piston 38 reciprocable in a cylinder in a block 39 secured in housing 12, the lever being pivoted to the piston rod by pin 41. An index actuating piston 42 is arranged in another cylinder in block 39 and is rigidly connected to a rack 40 which is slidable in another bore in the block and meshes with segmental pinion 25. Travel of piston 42 downwardly in FIG. 1, which rotates the pinion and arm 24 clockwise, is limited by abutment 43 on arm 24 with an abutment 44 on block 39. Return travel of piston 42 is limited by its abutment with a stop member 45 which is slidable in but keyed against rotation with respect to a bushing 46 that is fixed to housing 12. The stop 45 is threaded to a screw 47 to which a calibrated dial 48 is affixed, and also to a tubular screw 49 which is rotatable in but held against axial motion by plates 51 secured to the housing. A pin 52 carried by screw 47, and extending through longitudinally elongated slots in screw 49, connects the screws for rotation as a unit but permits them limited relative axial motion. By turning screw 47 the stop 45 is adjusted axially to vary the stroke of piston 42, and after such adjustment a clamp nut 53, which is threaded onto the outer end of screw 47, is tightened to move the screw, upwardly in FIG. 1, relative to tubular screw 49, to thereby take up backlash and clamp the stop in its adjusted position.

The stroke of piston 42 is so adjusted that the angular motion of arm 24 and pawl 21 about axis 13 will correspond to the desired angle of indexing. For example, if the index plate has seventy-two notches, a notch spacing of 5°, the piston stroke may be adjusted to produce an angular advance of the pawl of 30°, for a cutter of twelve blades, or of 20° for one of eighteen blades, or of 10° for one of thirty-six blades. The abutments 43, 44 limit clockwise travel of arm 24 to the position wherein the notch 15 engaged by tooth 22 of pawl 21 is directly beneath tooth 17 of pawl 16. In FIG. 2 tooth 22 is shown by broken lines 22' in this limit position.

In each index operation suitable valve means, not shown, first direct hydraulic fluid under pressure through port 54 into cylinder chamber 55, moving piston 38 downwardly to release pawl 16 and engage pawl 21. As its downward limit position is approached the piston uncovers port 56, applying fluid under pressure to chamber 57, to thereby lower the piston 42 and cause indexing motion of pawl 21 and index plate 14. Fluid exhaust from chamber 58 beneath piston 42 is through passage 59 and past spring-closed check valve 61 into chamber 62 beneath piston 38, and that from the latter chamber is through exhaust port 63. The terminal part of the indexing stroke is slowed by piston 42 covering port 64 of passage 59, so that the final exhaust of fluid from chamber 58 into passage 59 is through a bleed opening through a spring-closed check valve 65. Upon conclusion of the indexing stroke, the presure and exhaust connections to ports 54 and 63 are reversed. Thereupon fluid under pressure entering chamber 62 raises piston 38 to the position shown, allowing spring 19 to engage pawl 16 with the index plate and to disengage pawl 21 from the plate. The piston in its uppermost position abuts the adjacent cylinder head, so that, due to a slight clearance between block 31 and its slot in lever 27, upwardly-acting hydraulic pressure on the piston does not act upon the pawl while the latter is engaged. At the conclusion of its up stroke the piston 38 uncovers port 66 into passage 59, opens check valve 65, and raises piston 42, thereby effecting return of carrier 24 and pawl 21. Exhaust from chamber 57 is past spring-closed check valve 67 into chamber 55, and thence into port 54. The indexing cycle described is repeated after each blade of the cutter C has been sharpened.

Having now described the improved index and its operation, what is claimed as the invention is:

1. An index mechanism comprising a housing and a notched index plate rotatable therein, a locking pawl supported by the housing for engagement with the notches of the plate to hold the latter against rotation relative to the housing in both directions, an indexing pawl also engageable with said notches and a carrier for said indexing pawl mounted in the housing for indexing and return motions, said indexing pawl when engaged holding the plate against rotation relative to the carrier in both directions, a fluid-pressure actuated piston for effecting said indexing and return motions of the carrier, means for actuating said pawls to cause each one to release as the other engages, said pawl actuating means being arranged to operate in such timed relation with said piston that the index pawl is engaged throughout the indexing motion and the locking pawl throughout the return motion, abutment means to stop the indexing motion when the carrier is in a definite position wherein a notch of the plate is aligned with the locking pawl, and adjustable stop means to limit the return motion of the carrier.

2. A mechanism according to claim 1 in which the indexing pawl is aligned with the same notch of the index plate as the locking pawl when the carrier is in said definite position.

3. A mechanism according to claim 1 in which the carrier is movable in the housing about the same axis as the index plate.

4. A mechanism according to claim 1 in which the pawl actuating means comprises a fluid-pressure actuated piston controlling ports through which pressure is applied to the carrier actuating piston, the pawl actuating piston upon completion of one stroke uncovering one such port to cause one stroke of the carrier actuating piston and upon completion of the return stroke uncovering another such port to cause the return stroke of the carrier actuating piston.

5. A mechanism according to claim 1 in which the means for actuating said pawls comprises a lever pivoted to the housing and having a pivotal connection with the locking pawl, and a lifter for the indexing pawl pivoted to the housing and also having a pivotal connection with said lever.

6. A mechanism according to claim 5 in which the pawl actuating means comprises a fluid-pressure actuated piston having a pivotal connection with said lever.

7. A mechanism according to claim 5 in which said lifter has slidable engagement with said indexing pawl, the engaging part of the lifter being curved and having its center of curvature approximately at the axis of rotation of the index plate.

8. An index mechanism comprising a housing and a notched index plate rotatable therein, a locking pawl supported by the housing for engagement with the notches of the plate, an indexing pawl also engageable with said notches and a carrier for said indexing pawl mounted in the housing for indexing and return motions, a first fluid-pressure actuated piston for effecting said motions of the carrier, a second fluid-pressure actuated piston connected with both pawls for effecting release of one and engagement of the other on one stroke and engagement of said one of the pawls and release of the other on the return stroke, means for controlling the first piston including ports covered and uncovered by the second piston and through which actuating pressure is applied to the first piston, the second piston upon the completion of one stroke thereof uncovering one such port to cause one stroke of the first piston and upon completion of the return stroke thereof uncovering another such port to cause the return stroke of the first piston.

9. A mechanism according to claim 8 in which there are stop means to limit one stroke of the carrier to the position thereof wherein the indexing pawl is aligned with the same notch of the index plate as the locking pawl, and adjustable stop means to limit the return stroke of the carrier, whereby the mechanism may be adjusted for indexing through different angular increments.

10. An index mechanism comprising a housing and a notched index plate rotatable therein, a spring-backed locking pawl pivoted to the housing for engagement with the notches of the plate, a spring-backed indexing pawl also engageable with said notches and a carrier for said indexing pawl movable in the housing for indexing and return motions about the same axis as the index plate, a first fluid-pressure actuated piston having a rack-and-pinion connection to the carrier for effecting said motions of the carrier, a lever pivoted to the housing and having a pivotal connection with said locking pawl, a lifter for the indexing pawl pivoted to the housing and having a pivotal connection to the lifter such that when the lever disengages the locking pawl the lifter allows the indexing pawl to engage and that when the lever allows engagement of the locking pawl the lifter disengages the indexing pawl, a second fluid-pressure actuated piston pivotally connected to the lever for actuating the same, said second piston controlling ports through which pressure is applied to the first piston, the first piston upon completion of its stroke to disengage the locking pawl uncovering one such port to cause the indexing stroke of the first piston and upon completion of its stroke to disengage the indexing pawl uncovering another such port to cause the return stroke of the first piston, abutment means to stop the motion of the carrier in one direction in the position thereof wherein the indexing pawl is aligned with the same notch of the index plate as the locking pawl, and adjustable stop means to limit the return motion of the carrier, whereby the mechanism may be adjusted for indexing through different angular increments.

References Cited in the file of this patent

UNITED STATES PATENTS

| | | |
|---|---|---|
| 2,660,895 | Waters | Dec. 1, 1953 |
| 2,826,099 | Scholin et al. | Mar. 11, 1958 |
| 2,848,909 | Hill | Aug. 26, 1958 |